(12) United States Patent
Noguchi et al.

(10) Patent No.: US 11,393,497 B2
(45) Date of Patent: Jul. 19, 2022

(54) RESTRICTION OF SUSPENSION DIMPLE CONTACT POINT

(71) Applicant: Western Digital Technologies, Inc., San Jose, CA (US)

(72) Inventors: Yoshinobu Noguchi, Yokohama (JP); Tsuyoshi Matsumoto, Yamato (JP); Hiroyasu Tsuchida, Fujisawa (JP); Tomoyuki Sasaki, Yokohama (JP)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 17/175,555

(22) Filed: Feb. 12, 2021

(65) Prior Publication Data

US 2022/0139421 A1     May 5, 2022

Related U.S. Application Data

(60) Provisional application No. 63/109,480, filed on Nov. 4, 2020.

(51) Int. Cl.
    *G11B 5/48*         (2006.01)
    *G11B 5/187*      (2006.01)
    *G11B 5/596*      (2006.01)

(52) U.S. Cl.
    CPC .......... *G11B 5/4826* (2013.01); *G11B 5/1871* (2013.01); *G11B 5/4833* (2013.01); *G11B 5/59666* (2013.01)

(58) Field of Classification Search
    None
    See application file for complete search history.

(56) References Cited

U.S. PATENT DOCUMENTS

| | | | | |
|---|---|---|---|---|
| 5,079,660 A | * | 1/1992 | Yumura | G11B 5/4886 360/245.3 |
| 5,161,076 A | | 11/1992 | Inumochi et al. | |
| 5,381,288 A | * | 1/1995 | Karam, II | G11B 5/4826 360/245 |
| 5,473,488 A | * | 12/1995 | Gustafson | G11B 5/4826 360/245.5 |
| 5,608,590 A | * | 3/1997 | Ziegler | G11B 5/4826 360/245.1 |

(Continued)

FOREIGN PATENT DOCUMENTS

JP      2008243360 A      10/2008

OTHER PUBLICATIONS

Li, Longqui et al., An experimental study of the dimple/gimbal interface in a hard disk drive, Microsyst Technol, Accepted Dec. 29, 2010, Published online Jan. 13, 2011,17:863-868, Springer.

*Primary Examiner* — Jefferson A Evans
(74) *Attorney, Agent, or Firm* — John D. Henkhaus

(57) ABSTRACT

A head gimbal assembly (HGA) for a hard disk drive includes a primary dimple having a secondary structure protruding from the primary dimple, where a flexure is movably coupled with a load beam via the primary dimple, and where the secondary structure is configured to restrict the point of contact between the load beam and the flexure. Such an arrangement avoids any shift in the axis of rotation of the flexure, and the attached slider, due to any undesirable protrusion from the primary dimple which may arise in the manufacturing process. Examples of secondary structures include a micro-dimple, a ridge, and an embedded mass of material.

19 Claims, 8 Drawing Sheets

(56) References Cited

U.S. PATENT DOCUMENTS

| | | | | |
|---|---|---|---|---|
| 5,666,241 | A * | 9/1997 | Summers | G11B 5/4833 360/245.1 |
| 6,078,470 | A | 6/2000 | Danielson et al. | |
| 6,144,531 | A * | 11/2000 | Sawai | G11B 5/4826 360/245.1 |
| 6,246,546 | B1 * | 6/2001 | Tangren | G11B 5/4826 360/245.1 |
| 6,304,420 | B1 * | 10/2001 | Murphy | G11B 5/4833 360/245.7 |
| 6,469,870 | B1 * | 10/2002 | Summers | G11B 5/4826 360/245.3 |
| 6,594,116 | B1 * | 7/2003 | Ohwe | G11B 5/6005 360/245.1 |
| 6,738,225 | B1 * | 5/2004 | Summers | G11B 5/4826 360/245.1 |
| 6,965,500 | B1 * | 11/2005 | Hanna | G11B 5/4826 360/245 |
| 7,688,552 | B2 * | 3/2010 | Yao | G11B 5/4853 360/245.1 |
| 7,706,105 | B2 | 4/2010 | Maslov et al. | |
| 7,835,113 | B1 * | 11/2010 | Douglas | G11B 5/4826 360/245.1 |
| 7,864,488 | B1 | 1/2011 | Pan | |
| 7,907,367 | B1 * | 3/2011 | Chocholaty | G11B 5/4826 360/245.1 |
| 7,924,530 | B1 * | 4/2011 | Chocholaty | G11B 5/4826 360/245.1 |
| 8,259,416 | B1 * | 9/2012 | Davis | G11B 5/4826 360/245.1 |
| 8,717,712 | B1 * | 5/2014 | Bennin | G11B 5/4833 360/245.1 |
| 8,760,814 | B1 * | 6/2014 | Pan | G11B 5/4826 360/245.1 |
| 8,881,375 | B2 * | 11/2014 | Pokornowski | G11B 5/4833 29/603.03 |
| 8,995,094 | B1 | 3/2015 | Chen et al. | |
| 9,183,861 | B1 * | 11/2015 | Tsuchida | G11B 5/4873 |
| 2005/0270698 | A1 * | 12/2005 | Oh | G11B 5/4826 360/245.1 |
| 2005/0275972 | A1 * | 12/2005 | Takahashi | G11B 5/40 360/245.1 |
| 2008/0024928 | A1 * | 1/2008 | Yang | G11B 5/4826 360/245.1 |
| 2014/0078621 | A1 | 3/2014 | Miller et al. | |
| 2015/0162033 | A1 * | 6/2015 | Miller | G11B 5/4833 360/244.8 |

\* cited by examiner

```
┌─────────────────────────────────────────────────────────────┐
│ ETCH A CIRCULAR PATTERN FROM A METAL SHEET, LEAVING A       │
│ PROTRUSION PROTRUDING FROM THE ETCHED CIRCULAR PATTERN      │
│                           802                                │
└─────────────────────────────────────────────────────────────┘
                              │
                              ▼
┌─────────────────────────────────────────────────────────────┐
│ DIE PRESS THE METAL SHEET TO FORM A PRIMARY DIMPLE FROM THE │
│ ETCHED CIRCULAR PATTERN AND TO FORM A SECONDARY STRUCTURE,  │
│ FROM THE PROTRUSION, PROTRUDING FROM THE PRIMARY DIMPLE     │
│                           804                                │
└─────────────────────────────────────────────────────────────┘
```

FIG. 8

RESTRICTION OF SUSPENSION DIMPLE CONTACT POINT

FIELD OF EMBODIMENTS

Embodiments of the invention may relate generally to hard disk drives, and particularly to approaches to restricting the contact point of the suspension dimple.

BACKGROUND

A hard disk drive (HDD) is a non-volatile storage device that is housed in a protective enclosure and stores digitally encoded data on one or more circular disks having magnetic surfaces. When an HDD is in operation, each magnetic-recording disk is rapidly rotated by a spindle system. Data is read from and written to a magnetic-recording disk using a read-write head (or "transducer") that is positioned over a specific location of a disk by an actuator. A read-write head makes use of magnetic fields to write data to and read data from the surface of a magnetic-recording disk. A write head works by using the current flowing through its coil to produce a magnetic field. Electrical pulses are sent to the write head, with different patterns of positive and negative currents. The current in the coil of the write head produces a localized magnetic field across the gap between the head and the magnetic disk, which in turn magnetizes a small area on the recording medium.

An HDD includes at least one head gimbal assembly (HGA) that generally includes a slider that houses the read-write transducer (or "head"), and a suspension. Each slider is attached to the free end of a suspension that in turn is cantilevered from the rigid arm of an actuator. Several actuator arms may be combined to form a single movable unit, a head stack assembly (HSA), typically having a rotary pivotal bearing system. The suspension of a conventional HDD typically includes a relatively stiff load beam with a mount plate at its base end, which attaches to the actuator arm, and whose free end mounts a flexure that carries the slider and its read-write head. Positioned between the mount plate and the functional end of the load beam is a "hinge" that is compliant in the vertical bending direction (normal to the disk surface). The hinge enables the load beam to suspend and load the slider and the read-write head toward the spinning disk surface. It is then the function of the flexure to provide gimbaled support for the slider so that the slider can pitch and roll in order to adjust its orientation.

Any approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

Embodiments are illustrated by way of example, and not by way of limitation, in the figures of the accompanying drawings and in which like reference numerals refer to similar elements and in which:

FIG. 8 is a flow diagram illustrating a method of manufacturing a suspension dimple configured for a hard disk drive, according to an embodiment.

DETAILED DESCRIPTION

Generally, approaches to restricting the contact point or area of a suspension dimple for a hard disk drive, are described. In the following description, for the purposes of explanation, numerous specific details are set forth in order to provide a thorough understanding of the embodiments of the invention described herein. It will be apparent, however, that the embodiments of the invention described herein may be practiced without these specific details. In other instances, well-known structures and devices are shown in block diagram form in order to avoid unnecessarily obscuring the embodiments of the invention described herein.

Introduction

Terminology

References herein to "an embodiment", "one embodiment", and the like, are intended to mean that the particular feature, structure, or characteristic being described is included in at least one embodiment of the invention. However, instance of such phrases do not necessarily all refer to the same embodiment, The term "substantially" will be understood to describe a feature that is largely or nearly structured, configured, dimensioned, etc., but with which manufacturing tolerances and the like may in practice result in a situation in which the structure, configuration, dimension, etc. is not always or necessarily precisely as stated. For example, describing a structure as "substantially vertical" would assign that term its plain meaning, such that the sidewall is vertical for all practical purposes but may not be precisely at 90 degrees throughout.

While terms such as "optimal", "optimize", "minimal", "minimize", "maximal", "maximize", and the like may not have certain values associated therewith, if such terms are used herein the intent is that one of ordinary skill in the art would understand such terms to include affecting a value, parameter, metric, and the like in a beneficial direction consistent with the totality of this disclosure. For example, describing a value of something as "minimal" does not require that the value actually be equal to some theoretical minimum (e.g., zero), but should be understood in a practical sense in that a corresponding goal would be to move the value in a beneficial direction toward a theoretical minimum.

Context

Figure 2:
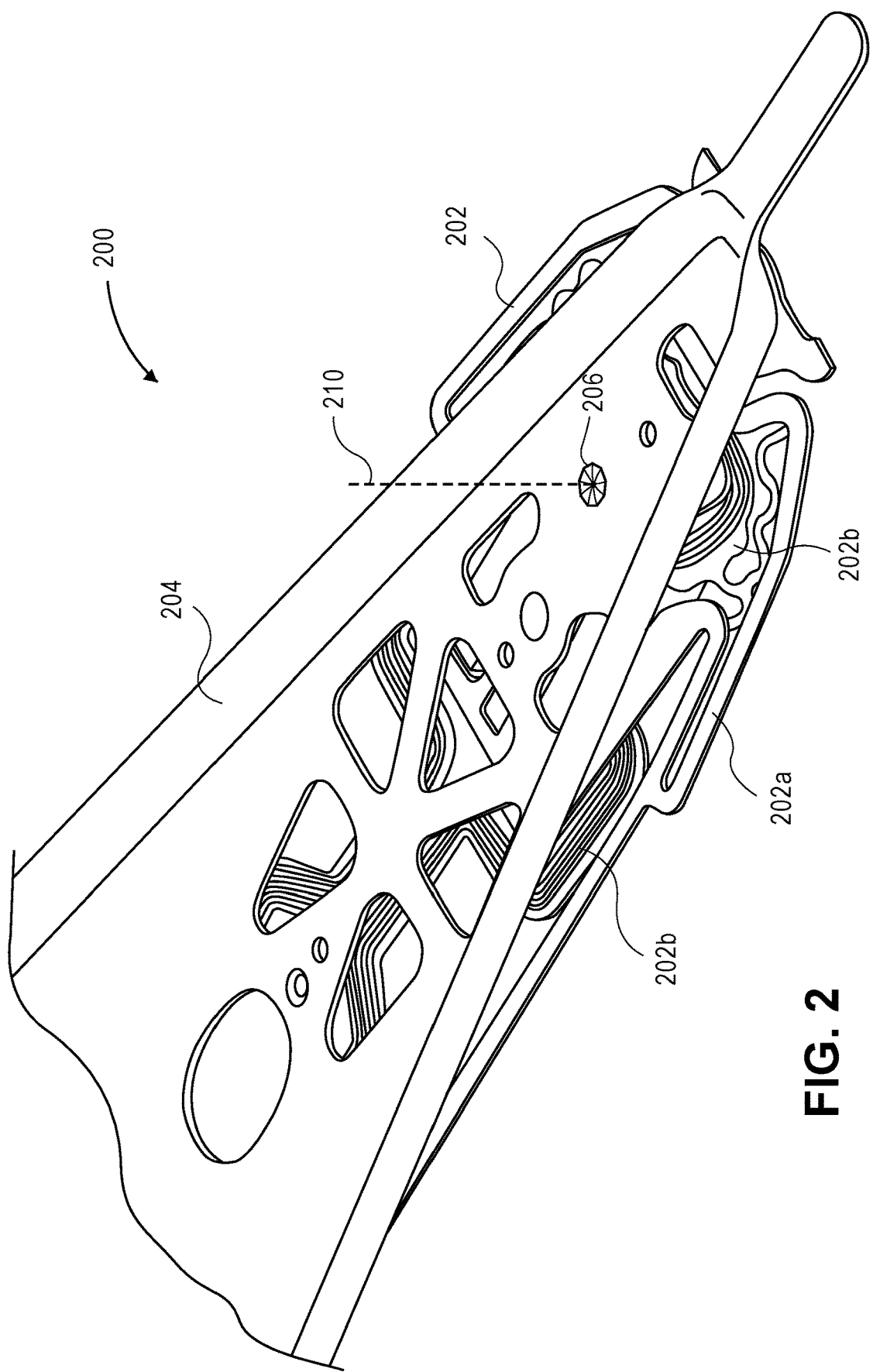
FIG. 2 is a perspective view illustrating a head gimbal assembly (HGA), according to an embodiment.

FIG. 2 is a perspective view illustrating a head gimbal assembly (HGA), according to an embodiment. HGA 200 comprises a flexure assembly 202 and a load beam 204 having a dimple 206. The dimple 206 depicted in FIG. 2 is a typical hemispherical dimple. The component on which the dimple is formed may vary from implementation to implementation. For example, dimple 206 could be constituent to the flexure assembly 202 rather than the load beam 204. Flexure assembly 202 may comprise multiple assembled layers such as a stainless steel layer 202a (also referred to as a "spring layer" due to one of its functional characteristics) coupled with an insulator (or "insulating") layer 202b. Flexure assembly 202 may also, but need not, comprise a separate conductor layer. Flexure assembly 202 is movably coupled to the load beam 204 via the dimple 206 and has freedom of rotation about the dimple axis 210. Because a head slider is coupled to a slider attachment platform of the flexure assembly 202, the slider likewise has freedom of rotation about dimple axis 210.

Figure 3:
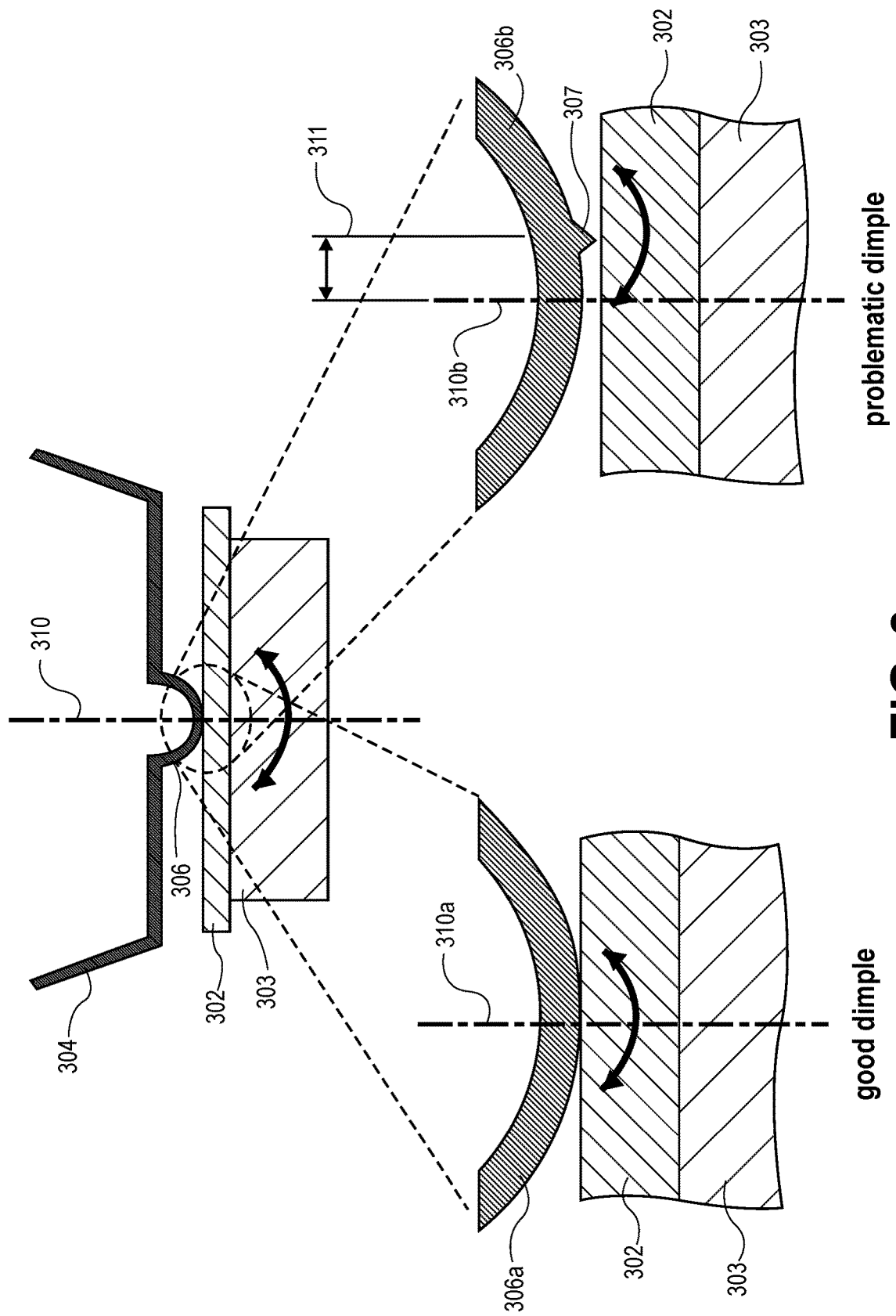
FIG. 3 is diagrammatic front view illustrating a good dimple versus a problematic dimple of an HGA.

FIG. 3 is diagrammatic front view illustrating a good dimple (lower left side of figure) versus a problematic dimple (lower right side of figure) of an HGA. A load beam 304 (see also, e.g., load beam 204 of FIG. 2) is typically manufactured and formed of fixed thickness stainless steel and shaped by a die press process, and a typical dimple 306 (see also, e.g., dimple 206 of FIG. 2) is a hemispherical shape. The head slider 303, attached to the flexure 302 (see also, e.g., flexure assembly 202 of FIG. 2) has freedom of rotation about the dimple axis 310 (see also, e.g., dimple axis 210 of FIG. 2) and dimple axis 310a of the good dimple. As the number of press shots increases, the surface of dimple 206, 306, 306a may become coarse and rough due to wear of the press die. As a result, the dimple such as 306b could have an undesirable protrusion 307, as depicted in the problematic dimple. If the protrusion 307 has a height that is higher than the top of the corresponding dimple 306b, then the dimple contact point would change from the top of the dimple 306b to the protrusion 307. Consequently, the head slider 303 would then rotate about the axis 311 of the protrusion 307 instead of the dimple axis 310b (and 310, 310a). This undesirable effect can then contribute to or be a cause of performance degradation regarding slider flyability.

Secondary Structure Protruding from a Primary Dimple

Figure 4:
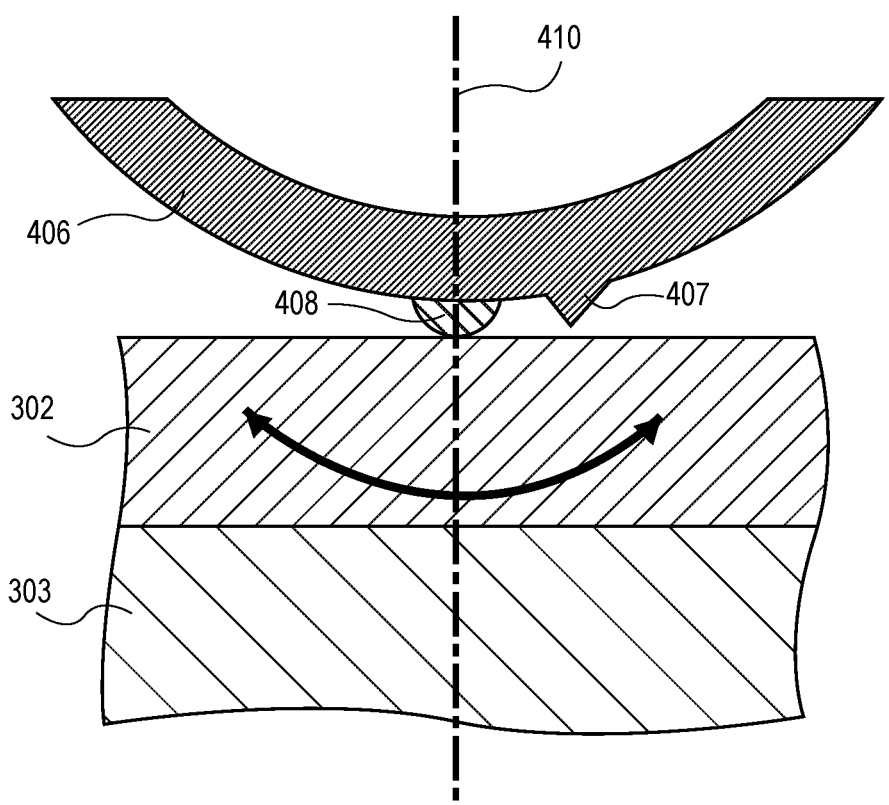
FIG. 4 is diagrammatic front view illustrating a secondary structure of a dimple of an HGA, according to an embodiment.

FIG. 4 is diagrammatic front view illustrating a secondary structure of a dimple of an HGA, according to an embodiment. Similarly to with load beam 204, 304 (FIGS. 2, 3), a dimple 406 (or "primary dimple 406") of a corresponding load beam may be formed by a die press process, and whereby the head slider 303 attached to the flexure 302 has freedom of rotation about the corresponding dimple axis 410. As discussed, a dimple such as dimple 406 may be formed having an undesirable protrusion 407 which, unabated or unattended to, could change the dimple contact point and the axis of rotation of the flexure 302-head slider 303 assembly based on the location and height of the protrusion 407. Thus, according to an embodiment, the primary dimple 406 is manufactured or formed to comprise a secondary structure 408 protruding or extending from the primary dimple 406. Hence, the flexure 302 is movably coupled with the load beam of which the primary dimple 406 is part via, by way of, or through the secondary structure 408 of the primary dimple 406, whereby the secondary structure 408 is configured and positioned to effectively restrict the point of contact between the load beam and the flexure 302, to the secondary structure 408. According to embodiments, the secondary structure 408 may take various forms, as described in more detail elsewhere herein.

Micro-Dimple

According to an embodiment, the secondary structure (see, e.g., secondary structure 408 of FIG. 4) is manufactured or formed in the form of a micro-dimple or secondary dimple protruding from the primary dimple (see, e.g., primary dimple 406 of FIG. 4). For a non-limiting example, a micro-dimple having a diameter of approximately 10 μm (micrometers), i.e., equivalent or similar to the typical contact area of a conventional dimple, may be formed on a primary dimple having a diameter of around 190-200 μm (e.g., depending on the etching depth, 5 μm for example). Thus, a 4-6% range for the diametric ratio of the micro-dimple relative to the primary dimple is suitable for the intended purpose. FIG. 5A includes views illustrating before secondary dimple forming, and FIG. 5B includes views illustrating after secondary dimple forming, according to a first embodiment.

FIG. 5A depicts a metal sheet 500 before dimple forming, comprising a recessed (e.g., etched) circular pattern 502, having a protrusion 504 protruding therefrom, where the circular pattern 502 is recessed from a primary or main surface 503 of the metal sheet 500. According to an embodiment, the protrusion protrudes from the center of the circular pattern 502, as depicted. Cross-section A-A further depicts the protrusion 504 protruding from the circular pattern 502, e.g., the protrusion 504 is composed of an unetched portion of the metal sheet 500.

Figure 5B:
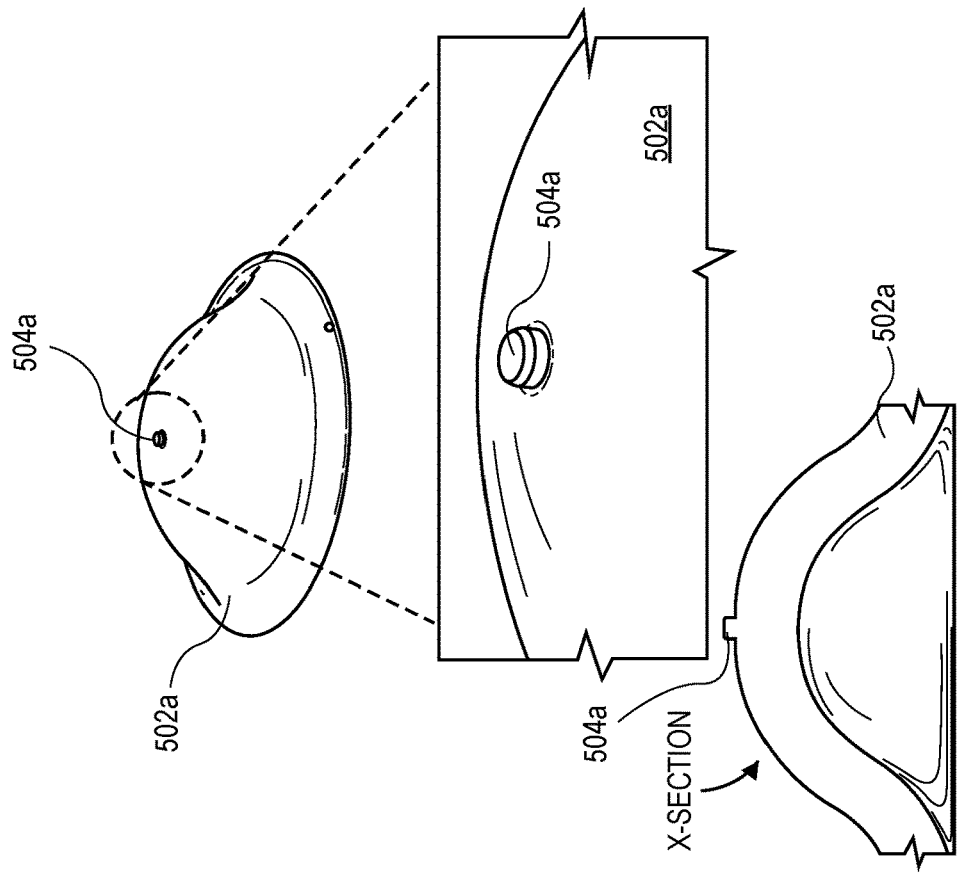
FIG. 5B includes views illustrating after secondary dimple forming, according to the first embodiment.
Figure 5A:
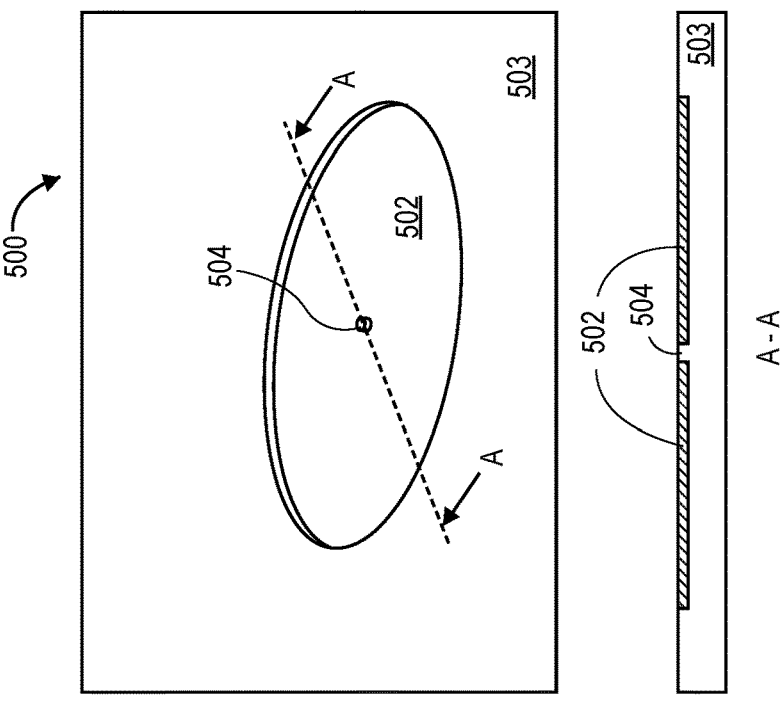
FIG. 5A includes views illustrating before secondary dimple forming, according to a first embodiment.

FIG. 5B depicts the metal sheet 500 (FIG. 5A) after dimple forming, now comprising a primary dimple 502a having a secondary structure 504a protruding from the primary dimple 502a. Here, the primary dimple 502a is formed from the circular pattern 502 (FIG. 5A) and the secondary structure 504a is formed from the protrusion 504 (FIG. 5A), such as by a metal pressing process. According to an embodiment, the secondary structure 504a is positioned substantially at the apex of the primary dimple 502a, as depicted, whereby the actual width of the new contact point/area corresponding to the secondary structure 504a is consistent with the contact point/area with prior approaches using solely a primary dimple. Thus, additional wear and/or additional concentrated force(s) against the flexure (e.g., in response to a shock event) are not considered likely. In this illustrated embodiment, the secondary structure 504a is referred to as a "micro-dimple".

Ridge

According to an embodiment, the secondary structure (see, e.g., secondary structure 408 of FIG. 4) is manufactured or formed in the form of a ridge protruding from and spanning at least a portion of an arc of the outer surface of the primary dimple (see, e.g., primary dimple 406 of FIG. 4). For a non-limiting example, a ridge having a width of 10 μm), i.e., equivalent or similar to the typical contact area of a conventional dimple, may be formed on a primary dimple having a diameter of around 190-200 μm (e.g., depending on the etching depth, 5 μm for example). Thus, a 4-6% range for the ratio of the width of the ridge relative to the diameter of the primary dimple is suitable for the intended purpose. FIG. 6A includes views illustrating before secondary dimple forming, and FIG. 6B includes views illustrating after secondary dimple forming, according to a second embodiment.

FIG. 6A depicts a metal sheet 600 before dimple forming, comprising a recessed (e.g., etched) circular pattern 602, having a protrusion 604 protruding therefrom, where the circular pattern 602 is recessed from a primary or main surface 603 of the metal sheet 600. According to an embodiment, the protrusion protrudes from along the centerline of the circular pattern 602, as depicted. Cross-section B-B further depicts the protrusion 604 protruding from the circular pattern 602, e.g., the protrusion 604 is composed of an unetched portion of the metal sheet 600.

Figure 6B:
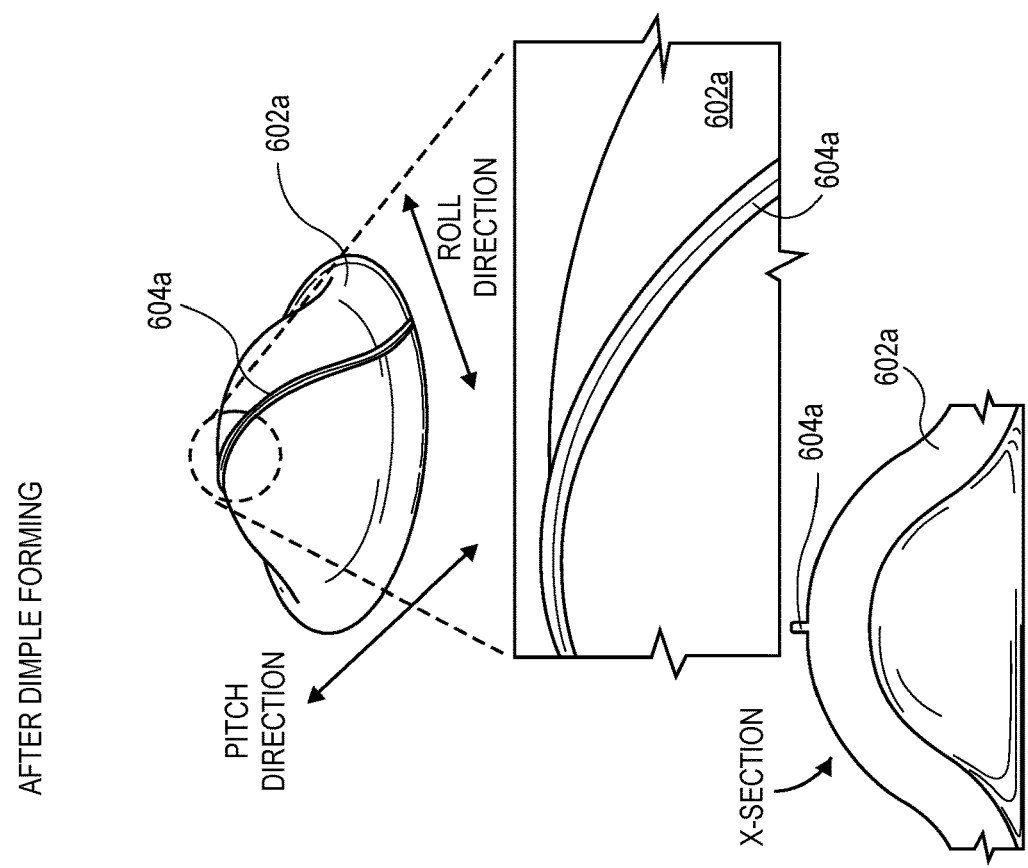
FIG. 6B includes views illustrating after secondary dimple forming, according to the second embodiment.
Figure 6A:
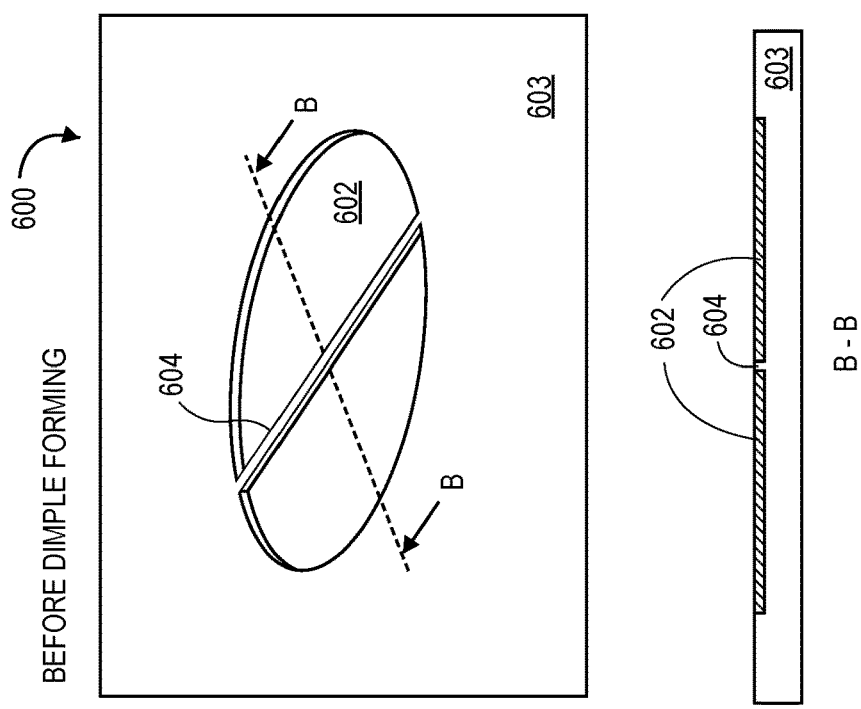
FIG. 6A includes views illustrating before secondary dimple forming, according to a second embodiment.

FIG. 6B depicts the metal sheet 600 (FIG. 6A) after dimple forming, now comprising a primary dimple 602a having a secondary structure 604a protruding from the primary dimple 602a. Here, the primary dimple 602a is formed from the circular pattern 602 (FIG. 5A) and the secondary structure 604a is formed from the protrusion 604 (FIG. 5A), such as by a metal pressing process. According to an embodiment, the secondary structure 604a is positioned substantially at the longest arc of the outer surface of the primary dimple 602a, as depicted. According to an embodiment, the secondary structure 604a is positioned in or along the pitch direction, thereby restricting the contact point only in the roll direction. In this illustrated embodiment, the secondary structure 604a is referred to as a "ridge".

Embedded Material

Figure 7:
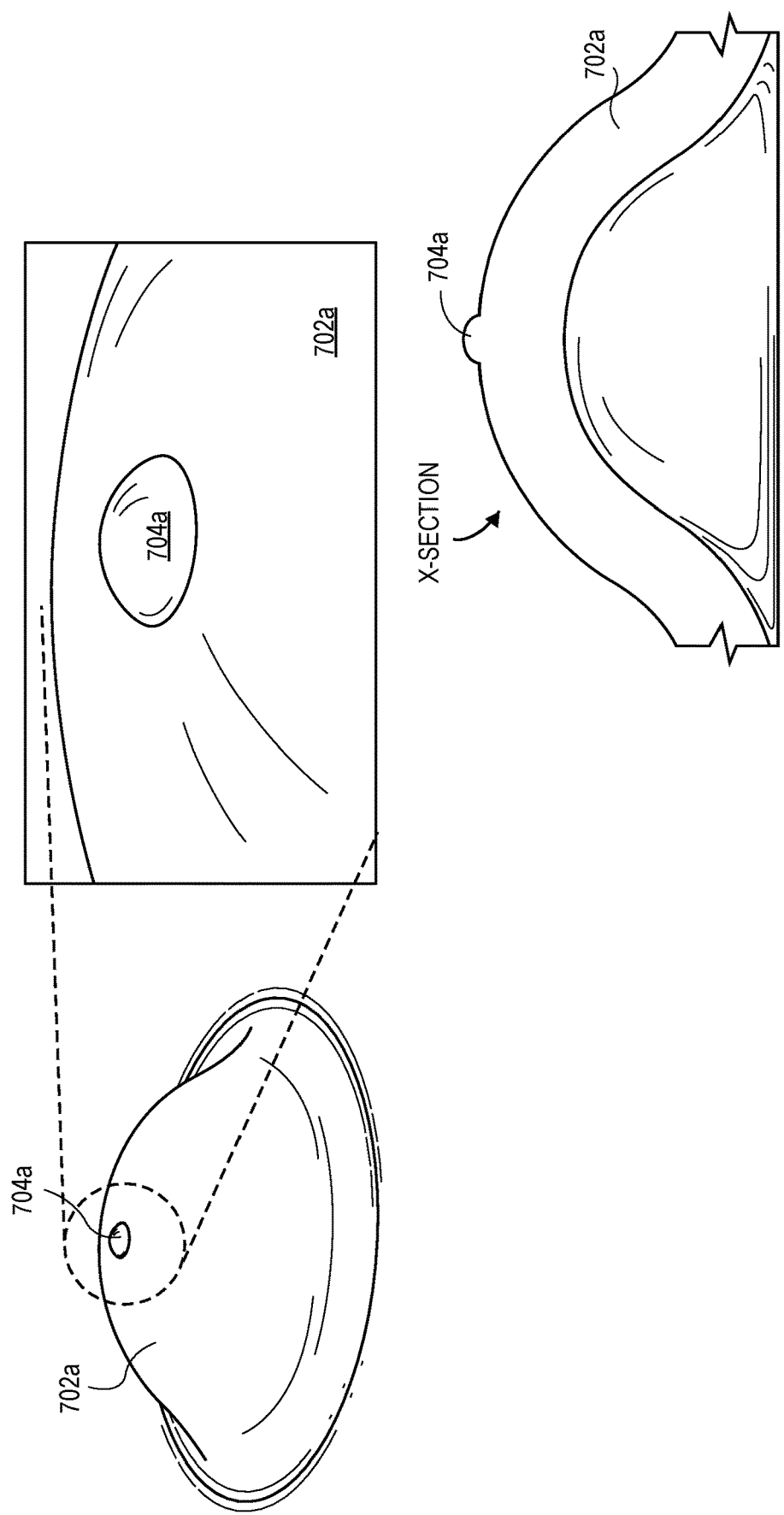
FIG. 7 includes views illustrating after secondary dimple forming, according to a third embodiment.

According to an embodiment, the secondary structure (see, e.g., secondary structure 408 of FIG. 4) is manufactured or formed in the form of a mass of material embedded onto the outer surface of the primary dimple (see, e.g., primary dimple 406 of FIG. 4). FIG. 7 includes views illustrating after secondary dimple forming, according to a third embodiment.

FIG. 7 depicts a metal sheet after dimple forming, now comprising a primary dimple 702a having a secondary structure 704a embedded with or onto and protruding from the primary dimple 702a. Here, the primary dimple 702a is formed from a metal sheet of fixed or uniform thickness, and the secondary structure 704a is formed from a hard material embedded onto the top of the primary dimple 702a, as depicted. For a non-limiting example, a ball of hard material (such as a bearing steel, advanced ceramic, diamond, and the like) having a diameter of 50 μm may be embedded onto a primary dimple having a diameter of 200 μm. According to an embodiment, the secondary structure 704a is positioned substantially at the apex of the primary dimple 702a, as depicted.

Method of Manufacturing Suspension Dimple

FIG. 8 is a flow diagram illustrating a method of manufacturing a suspension dimple configured for a hard disk drive, according to an embodiment. The method of FIG. 8 may be used to manufacture the various secondary structures illustrated and described herein in reference to FIGS. 5A-6B, and equivalents and variants thereof.

At block 802, a circular pattern is etched from a metal sheet, leaving a protrusion protruding from the etched circular pattern. For example, circular pattern 502, 602 (FIGS. 5A, 6A) is etched from a metal sheet 503, 603 (FIGS. 5A, 6A), leaving a protrusion 504, 604 (FIGS. 5A, 6A) protruding from the etched circular pattern 502, 602.

At block 804, the metal sheet is pressed to form a primary dimple from the etched circular pattern and to form a secondary structure, from the unetched protrusion, protruding from the primary dimple. For example, the metal sheet 503, 603 is die pressed to form a corresponding primary dimple 502a, 602a (FIGS. 5B, 6B) from the etched circular pattern 502, 602 and to form a secondary structure 504a, 604a (e.g., a micro-dimple of FIG. 5B or a ridge of FIG. 6B), from the unetched protrusion 504, 604, protruding from the primary dimple 502a, 602a.

Thus, with implementation of the approaches described and illustrated herein, the suspension dimple contact point and the head slider rotational axis would not change even if the dimple surface becomes coarse and rough due to wear of the press die and, therefore, slider flyability performance would be stabilized. Unless specifically stated, embodiments are not necessarily limited to the particular forms and processes described in reference to FIG. 8. For example, while use of etched circular patterns are described and illustrated herein as a suitable approach to forming a corresponding hemispherical primary dimple, various other etched patterns may be used to form other corresponding non-hemispherical shaped primary dimples, such as an ellipsoidal primary dimple. For another example, while use of die pressing and embedding techniques are described and illustrated herein as a suitable approach to forming a primary dimple and corresponding secondary structure, other metal forming or coupling techniques may be employed, such as use of an adhesive rather than die pressing and embedding as described. For another example, while the disclosed techniques are described primarily in reference to a load beam dimple, similar techniques may be used in the context of forming a primary dimple and secondary structure on a flexure as well.

Physical Description of an Illustrative Operating Context

Embodiments may be used in the context of a digital data storage device (DSD) such as a hard disk drive (HDD). Thus, in accordance with an embodiment, a plan view illustrating a conventional HDD 100 is shown in FIG. 1 to aid in describing how a conventional HDD typically operates.

Figure 1:
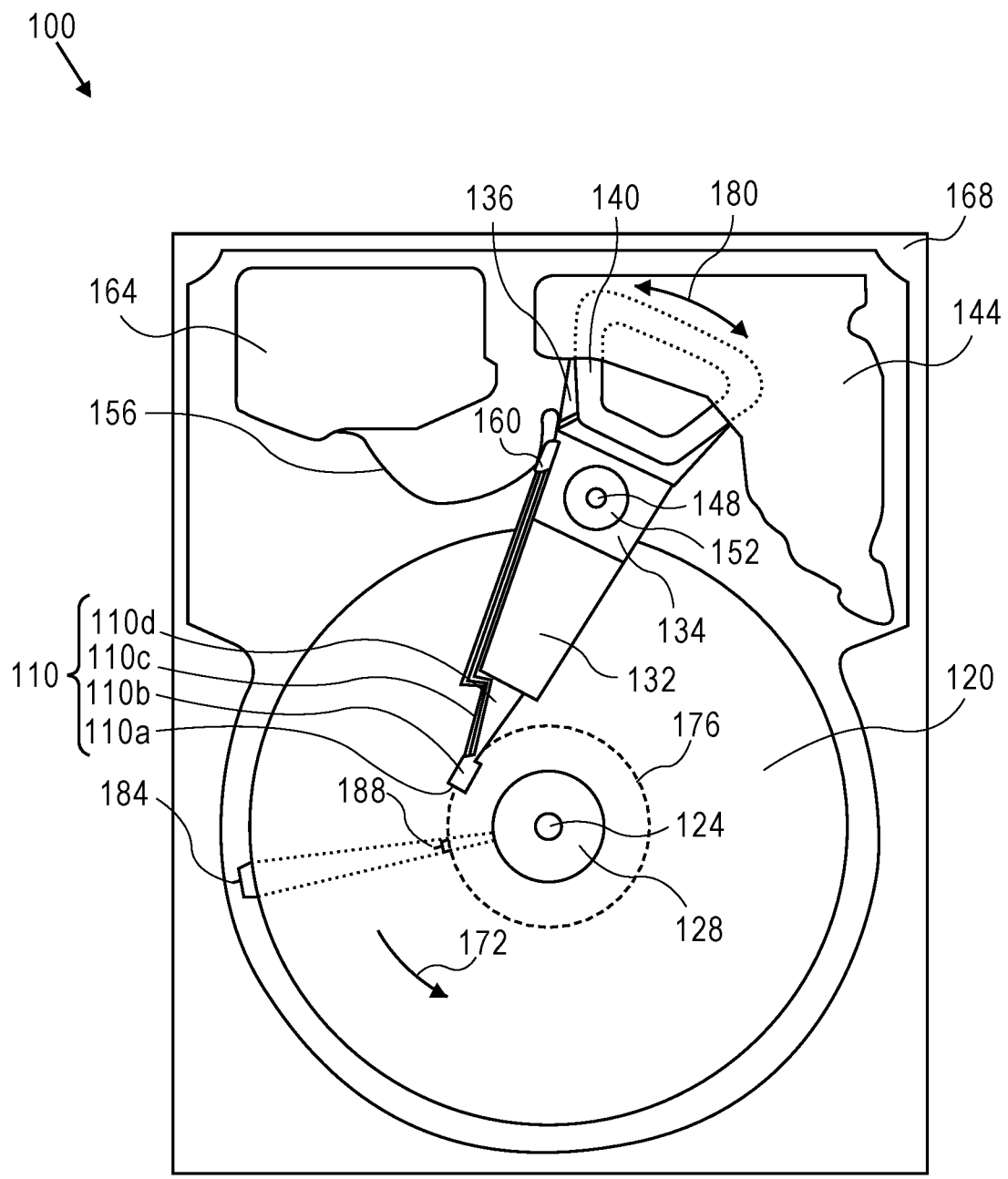
FIG. 1 is a plan view illustrating a hard disk drive, according to an embodiment.

FIG. 1 illustrates the functional arrangement of components of the HDD 100 including a slider 110b that includes a magnetic read-write head 110a. Collectively, slider 110b and head 110a may be referred to as a head slider. The HDD 100 includes at least one head gimbal assembly (HGA) 110 including the head slider, a lead suspension 110c attached to the head slider typically via a flexure, and a load beam 110d attached to the lead suspension 110c. The HDD 100 also includes at least one recording medium 120 rotatably mounted on a spindle 124 and a drive motor (not visible) attached to the spindle 124 for rotating the medium 120. The read-write head 110a, which may also be referred to as a transducer, includes a write element and a read element for respectively writing and reading information stored on the medium 120 of the HDD 100. The medium 120 or a plurality of disk media may be affixed to the spindle 124 with a disk clamp 128.

The HDD 100 further includes an arm 132 attached to the HGA 110, a carriage 134, a voice-coil motor (VCM) that includes an armature 136 including a voice coil 140 attached to the carriage 134 and a stator 144 including a voice-coil magnet (not visible). The armature 136 of the VCM is attached to the carriage 134 and is configured to move the arm 132 and the HGA 110 to access portions of the medium 120, all collectively mounted on a pivot shaft 148 with an interposed pivot bearing assembly 152. In the case of an HDD having multiple disks, the carriage 134 may be referred to as an "E-block," or comb, because the carriage is arranged to carry a ganged array of arms that gives it the appearance of a comb.

An assembly comprising a head gimbal assembly (e.g., HGA 110) including a flexure to which the head slider is coupled, an actuator arm (e.g., arm 132) and/or load beam to which the flexure is coupled, and an actuator (e.g., the VCM) to which the actuator arm is coupled, may be collectively referred to as a head stack assembly (HSA). An HSA may, however, include more or fewer components than those described. For example, an HSA may refer to an assembly that further includes electrical interconnection components. Generally, an HSA is the assembly configured to move the head slider to access portions of the medium 120 for read and write operations.

With further reference to FIG. 1, electrical signals (e.g., current to the voice coil 140 of the VCM) comprising a write signal to and a read signal from the head 110a, are transmitted by a flexible cable assembly (FCA) 156 (or "flex cable"). Interconnection between the flex cable 156 and the head 110a may include an arm-electronics (AE) module 160, which may have an on-board pre-amplifier for the read signal, as well as other read-channel and write-channel electronic components. The AE module 160 may be attached to the carriage 134 as shown. The flex cable 156 may be coupled to an electrical-connector block 164, which provides electrical communication, in some configurations, through an electrical feed-through provided by an HDD housing 168. The HDD housing 168 (or "enclosure base" or "baseplate" or simply "base"), in conjunction with an HDD cover, provides a semi-sealed (or hermetically sealed, in some configurations) protective enclosure for the information storage components of the HDD 100.

Other electronic components, including a disk controller and servo electronics including a digital-signal processor (DSP), provide electrical signals to the drive motor, the voice coil 140 of the VCM and the head 110a of the HGA 110. The electrical signal provided to the drive motor enables the drive motor to spin providing a torque to the spindle 124 which is in turn transmitted to the medium 120 that is affixed to the spindle 124. As a result, the medium 120 spins in a direction 172. The spinning medium 120 creates a cushion of air that acts as an air-bearing on which the air-bearing surface (ABS) of the slider 110b rides so that the slider 110b flies above the surface of the medium 120 without making contact with a thin magnetic-recording layer in which information is recorded. Similarly in an HDD in which a lighter-than-air gas is utilized, such as helium for a non-limiting example, the spinning medium 120 creates a cushion of gas that acts as a gas or fluid bearing on which the slider 110b rides.

The electrical signal provided to the voice coil 140 of the VCM enables the head 110a of the HGA 110 to access a track 176 on which information is recorded. Thus, the armature 136 of the VCM swings through an arc 180, which enables the head 110a of the HGA 110 to access various tracks on the medium 120. Information is stored on the medium 120 in a plurality of radially nested tracks arranged in sectors on the medium 120, such as sector 184. Correspondingly, each track is composed of a plurality of sectored track portions (or "track sector") such as sectored track portion 188. Each sectored track portion 188 may include recorded information, and a header containing error correction code information and a servo-burst-signal pattern, such as an ABCD-servo-burst-signal pattern, which is information that identifies the track 176. In accessing the track 176, the read element of the head 110a of the HGA 110 reads the servo-burst-signal pattern, which provides a position-error-signal (PES) to the servo electronics, which controls the electrical signal provided to the voice coil 140 of the VCM, thereby enabling the head 110a to follow the track 176. Upon finding the track 176 and identifying a particular sectored track portion 188, the head 110a either reads information from the track 176 or writes information to the track 176 depending on instructions received by the disk controller from an external agent, for example, a microprocessor of a computer system.

An HDD's electronic architecture comprises numerous electronic components for performing their respective functions for operation of an HDD, such as a hard disk controller ("HDC"), an interface controller, an arm electronics module, a data channel, a motor driver, a servo processor, buffer memory, etc. Two or more of such components may be combined on a single integrated circuit board referred to as a "system on a chip" ("SOC"). Several, if not all, of such electronic components are typically arranged on a printed circuit board that is coupled to the bottom side of an HDD, such as to HDD housing 168.

References herein to a hard disk drive, such as HDD 100 illustrated and described in reference to FIG. 1, may encompass an information storage device that is at times referred to as a "hybrid drive". A hybrid drive refers generally to a storage device having functionality of both a traditional HDD (see, e.g., HDD 100) combined with solid-state storage device (SSD) using non-volatile memory, such as flash or other solid-state (e.g., integrated circuits) memory, which is electrically erasable and programmable. As operation, management and control of the different types of storage media typically differ, the solid-state portion of a hybrid drive may include its own corresponding controller functionality, which may be integrated into a single controller along with the HDD functionality. A hybrid drive may be architected and configured to operate and to utilize the solid-state portion in a number of ways, such as, for non-limiting examples, by using the solid-state memory as cache memory, for storing frequently-accessed data, for storing I/O intensive data, and the like. Further, a hybrid drive may be architected and configured essentially as two storage devices in a single enclosure, i.e., a traditional HDD and an SSD, with either one or multiple interfaces for host connection.

Extensions and Alternatives

In the foregoing description, embodiments of the invention have been described with reference to numerous specific details that may vary from implementation to implementation. Therefore, various modifications and changes may be made thereto without departing from the broader spirit and scope of the embodiments. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

In addition, in this description certain process steps may be set forth in a particular order, and alphabetic and alphanumeric labels may be used to identify certain steps. Unless specifically stated in the description, embodiments are not necessarily limited to any particular order of carrying out such steps. In particular, the labels are used merely for convenient identification of steps, and are not intended to specify or require a particular order of carrying out such steps.

What is claimed is:

1. A head gimbal assembly (HGA) comprising:
   a head slider housing a read-write transducer configured to read from and to write to a rotating disk medium;
   a load beam;
   a flexure movably coupled with the load beam and to which the head slider is attached; and
   a primary dimple comprising a secondary structure protruding from the primary dimple, wherein a width of the secondary structure relative to the diameter of the primary dimple is within a range of 4-6%;
   wherein the flexure is movably coupled with the load beam via the secondary structure of the primary dimple.

2. The HGA of claim 1, wherein the secondary structure is configured to restrict the point of contact between the load beam and the flexure to the secondary structure.

3. The HGA of claim 1, wherein the secondary structure comprises a micro-dimple.

4. The HGA of claim 3, wherein the micro-dimple is positioned at an apex of the primary dimple.

5. A hard disk drive comprising the HGA of claim 4.

6. The HGA of claim 1, wherein the secondary structure comprises a ridge spanning at least a portion of an arc of an outer surface of the primary dimple.

7. The HGA of claim 6, wherein the ridge is positioned coincident with and spans the entirety of the longest arc of the outer surface of the primary dimple.

8. The HGA of claim 6, wherein:
   the HGA has a longitudinal pitch direction along its length and a lateral roll direction along its width; and
   the ridge is positioned along the pitch direction.

9. A hard disk drive comprising the HGA of claim 8.

10. The HGA of claim 1, wherein the secondary structure comprises a mass of material embedded onto the primary dimple.

11. The HGA of claim 10, wherein the mass of material is positioned at an apex of the primary dimple.

12. A hard disk drive comprising the HGA of claim 11.

13. The HGA of claim 1, wherein the primary dimple is constituent to the load beam.

14. The HGA of claim 1, wherein the primary dimple is constituent to the flexure.

15. The HGA of claim 1, wherein the primary dimple is substantially hemispherical.

16. A method of manufacturing a suspension component configured for a hard disk drive, the method comprising:
   etching a circular pattern from a metal sheet, leaving a protrusion protruding from the etched circular pattern; and
   die pressing the metal sheet to form a primary dimple from the etched circular pattern and to form a secondary structure, from the protrusion, protruding from the primary dimple, wherein a width of the secondary structure relative to the diameter of the primary dimple is within a range of 4-6%.

17. The method of claim 16, wherein:
   etching the circular pattern includes leaving the protrusion protruding from the center of the circular pattern; and
   die pressing the metal sheet to form the secondary structure includes forming a micro-dimple positioned at an apex of the primary dimple.

18. The method of claim 16, wherein:
   etching the circular pattern includes leaving the protrusion protruding along a centerline of the circular pattern; and
   die pressing the metal sheet to form the secondary structure includes forming a spanning at least a portion of an arc of an outer surface of the primary dimple.

19. A hard-disk drive comprising:
   a disk medium rotatably mounted on a spindle;
   a head slider housing a read-write transducer configured to read from and to write to the disk medium;
   an actuator configured to move the head slider to access portions of the disk medium; and
   a head gimbal assembly (HGA) comprising a flexure to which the head slider is attached, wherein the flexure comprises:
   a load beam;
   a flexure movably coupled with the load beam and to which the head slider is attached; and
   means for restricting the point of contact between the load beam and the flexure to a portion of a primary dimple via which the flexure is movably coupled with the load beam, wherein a width of the means for restricting relative to the diameter of the primary dimple is within a range of 4-6%.

* * * * *